Figure 1:
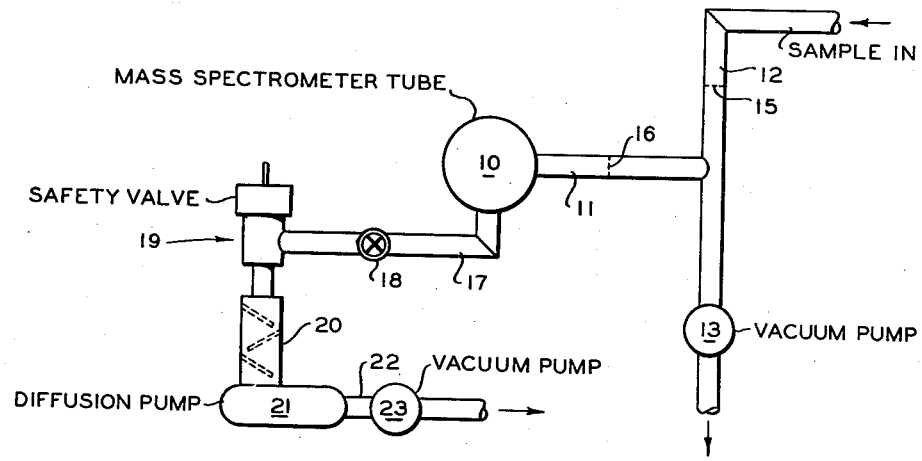

Nov. 6, 1956  D. E. LUPFER ET AL  2,769,912
SHUT-OFF VALVE
Filed April 12, 1954

INVENTORS
D. E. LUPFER
A. B. BROERMAN
BY
Hudson & Young
ATTORNEYS

United States Patent Office 2,769,912
Patented Nov. 6, 1956

2,769,912
SHUT-OFF VALVE

Dale E. Lupfer and Arthur B. Broerman, Bartlesville, Okla., assignors to Phillips Petroleum Company, a corporation of Delaware Application April 12, 1954, Serial No. 422,586

12 Claims. (Cl. 250—41.9)

This invention relates to a time delay shut-off valve. In another aspect it relates to a system employing a safety shut-off valve between a vacuum pump and an evacuated chamber. In one specific aspect it relates to a time delay shut-off valve which is closed if a power supply is interrupted longer than a predetermined time interval.

Vacuum systems such as employed in mass spectrometers usually are maintained by a diffusion pump connected upstream from a mechanical vacuum pump. In such a system there is danger that considerable damage may be done to the mass spectrometer tube in the event of electrical power failure which stops the mechanical pump. This damage can result from vaporized oil in the diffusion pump being carried back upstream to contaminate the spectrometer tube. If the mechanical pump should fail, the pressure in the spectrometer tube tends to increase slowly, during which time oil may continue to be vaporized from the heat retained by the heating coil of the diffusion pump. An increase in pressure in the diffusion pump may result in the oil being cracked, and the resulting cracked products tend to diffuse more readily back upstream into the spectrometer tube. For these reasons it becomes important to disconnect the diffusion pump from the spectrometer tube in the event of electrical power failure. However, the above-mentioned oil diffusion normally does not take place for a matter of several minutes following pump failure, such that momentary power failures are not harmful. Thus, it is not necessary to shut down the system if the power failure is only temporary.

In accordance with the present invention there is provided a safety shut-off valve which can be positioned between a vacuum chamber and a diffusion pump. This valve normally is retained open so that the vacuum chamber is in communication with the diffusion pump. The valve head is attached to a piston which is free to move in a piston chamber mounted adjacent the valve body. When the valve is open, fluid is admitted into the piston chamber on the side of the piston which moves the valve head off the valve seat. However, in the event of electrical power failure, this supply of fluid is disconnected and fluid is instead applied to the second side of the piston to close the valve. A restricted vent is provided so that the piston moves slowly in the direction tending to close the valve. In the event electrical power is restored during a predetermined time interval, then the fluid is once again returned to the first side of the piston which restores the valve to a fully open position.

Accordingly, it is an object of this invention to provide an improved time delay safety shut-off valve.

Another object is to provide a vacuum system incorporating a time delay shut-off valve between a vacuum pump and a vacuum chamber.

A further object is to provide a safety shut-off valve which is closed in the event of electrical or pneumatic power supply failure, but which is reopened if these power supplies are restored within a predetermined time interval.

Figure 2:
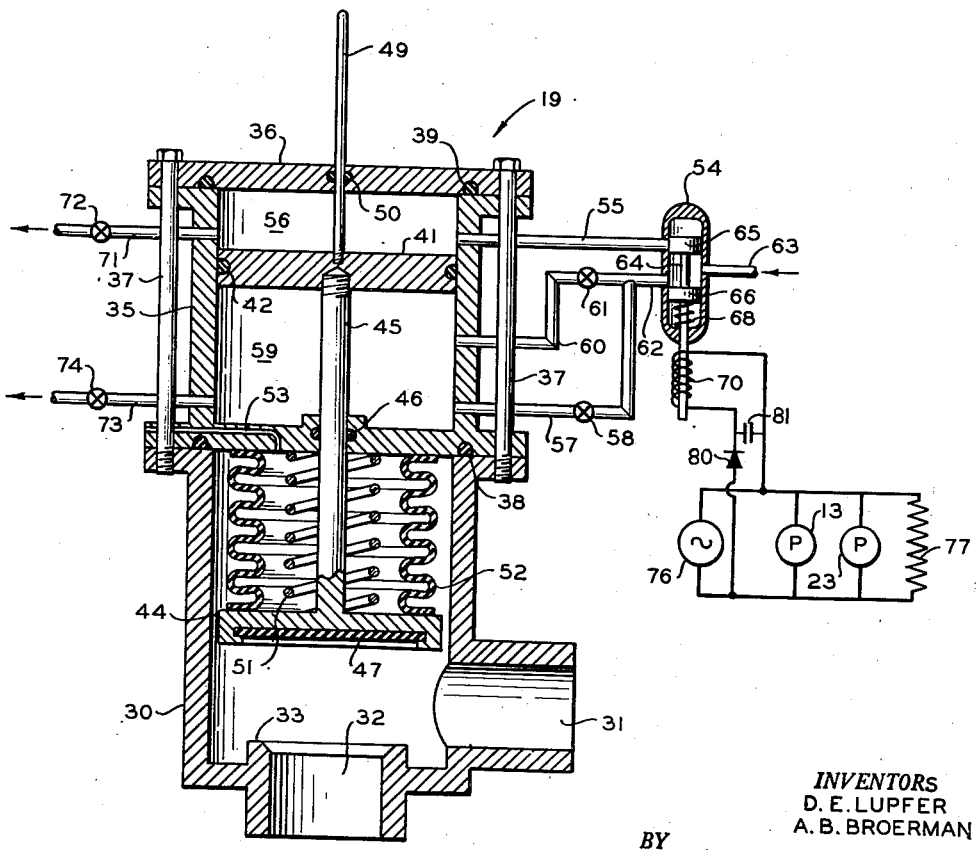

Various other objects, advantages and features of this invention should become apparent from the following detailed description taken in conjunction with the accompanying drawing in which:

Figure 1 is a schematic representation of a mass spectrometer employing the shut-off valve of this invention in the vacuum system; and Figure 2 is a detailed view, shown partially in section, of the shut-off valve of this invention.

Referring now to the drawing in detail and to Figure 1 in particular there is shown a mass spectrometer tube 10 which is connected by conduits 11 and 12 to a source of gas, not shown, which is to be analyzed. A vacuum pump 13 is connected to conduit 12 which is restricted by an orifice 15 which form the primary viscous leak for the gas into tube 10. Conduit 11 is restricted by a second orifice 16 having smaller openings than orifice 15 so as to form a molecular leak path for the gas into tube 10. Tube 10 is connected by a conduit 17, which has a valve 18 therein, to the inlet of a safety shut-off valve 19. The outlet of valve 19 is connected through a baffle chamber 20 to the inlet of an oil or mercury diffusion pump 21. The outlet of pump 21 is connected by a conduit 22 to the inlet of a second vacuum pump 23. In normal operation, valves 18 and 19 are open so that the interior of tube 10 is evacuated by pumps 21 and 23. The purpose of baffle chamber 20 is to prevent fluid in pump 21 from diffusing back upstream into tube 10. Vacuum pumps 13 and 23 are electrically operated.

Valve 19, as illustrated in detail in Figure 2, comprises a cylindrical valve body 30 which is provided with an inlet 31 and an outlet 32. One end of outlet 32 forms a valve seat 33. A piston chamber 35 is mounted above valve body 30, and a cover plate 36 is attached to the top of piston chamber 35. Valve body 30, chamber 35 and plate 36 are secured together by a plurality of bolts 37. A first O-ring 38 is positioned between valve body 30 and piston chamber 35, and a second O-ring 39 is positioned between piston chamber 35 and cover plate 36. A piston 41, having a sealing ring 42 in the periphery thereof, is disposed within chamber 35 to make slideable contact with the inner wall thereof. A valve head 44 is positioned within valve body 30 and is attached to piston 41 by a plunger 45 which extends upwardly through a central opening in the lower plate of chamber 35. An O-ring 46 is contained in the lower plate of chamber 35 surrounding plunger 45. The lower edge of valve head 44 is provided with a disk 47 which engages valve seat 33 in a vacuum tight seal. Disk 47 preferably is formed of Teflon (polymerized tetrafluoroethylene). A position indicating rod 49 is threaded to piston 41 and extends upwardly through an opening in cover plate 36 which contains an O-ring 50. A compression spring 51 is positioned between the lower plate of piston chamber 35 and valve head 44, and a flexible bellows 52 is likewise disposed between the lower plate of chamber 35 and valve head 44 to form a fluid tight seal between these elements. A pressure equalizing vent 53 communicates between the interior of bellows 52 and the atmosphere surrounding valve 19.

A first conduit 55 communicates between the region 56 in chamber 35 above piston 41 and a first outlet of a three-way solenoid operated valve 54. A second conduit 57, having a manually operated valve 58 therein, communicates at one end with the region 59 in chamber 35 below piston 41. Conduit 57 enters chamber 35 at or near the bottom of region 59. A third conduit 60, having a manually operated valve 61 therein, communicates with region 59 at a point spaced upwardly from the bottom of chamber 35. Conduits 57 and 60 each communicate with a conduit 62 which in turn communicates with the second outlet of valve 54. A conduit 63 is connected between the inlet of valve 54 and a source of fluid pressure, not shown, which can supply air at approximately fifteen pounds per square inch gage pressure, for example. Valve 54 has a movable plunger 64 therein which supports a pair of spaced pistons 65 and 66. Plunger 64 normally is biased at a first position in valve 54 by a compression spring 68 such that piston 66 covers the outlet opening which communicates with conduit 62 and piston 65 is above the outlet opening which communicates with conduit 62. At this first position, conduits 63 and 55 are in communication through valve 54. When the solenoid 70 is energized, plunger 64 is moved to a second position (as illustrated) so that piston 65 blocks the outlet opening communicating with conduit 55 and piston 66 is below the outlet opening communicating with conduit 62. At this second position, conduits 63 and 62 are in communication with one another. An outlet conduit 71, having a manually operated valve 72 therein, communicates with region 56 in chamber 35, and a second outlet conduit 73, having a manually operated valve 74 therein, communicates with region 59 in chamber 35.

Pumps 13 and 23 are operated from a source of electrical energy 76. Solenoid 70 is also energized by energy source 76 so that pistons 65 and 66 are in the second-mentioned positions when vacuum pumps 13 and 23 are energized. A heating coil 77, which vaporizes the oil in diffusion pump 21, is also energized by source 76. If alternating current is employed to operate motors 13 and 23, a rectifier 80 and capacitor 81 can be inserted in circuit with solenoid 70 as shown in Figure 2.

In normal operation of the vacuum system, solenoid 70 is energized so that the fluid pressure in conduit 63 is applied through conduit 60 to region 59, valve 61 being open and valve 58 being closed. Bleed valves 74 and 72 are opened slightly to provide outlets from respective regions 59 and 56. The fluid pressure in region 59 overcomes the downward force exerted by spring 51 and retains piston 41 in the illustrated up position. Valve head 44 is thus retained above valve seat 33 such that inlet 31 and outlet 32 of valve body 30 are in communication and tube 10 is evacuated by pumps 21 and 23. In the event of electrical power failure, solenoid 70 is deenergized and spring 68 moves piston 66 to block the opening communicating with conduit 62. This also moves piston 65 above the opening communicating with conduit 55 such that conduits 55 and 63 are in communication. The fluid pressure in conduit 63 is applied to region 56 to move piston 41 downwardly so that valve head 44 is moved toward valve seat 33. This downward movement is aided by spring 51, but is retarded by the original pressure in region 59. The closing of the valve is thus delayed by the time required for the pressure in region 59 to be reduced through outlet conduit 73. The opening of valve 74 adjusts the time required to close the valve. In the event electrical power is restored prior to the time that piston 41 moves below conduit 60, then fluid pressure is once again applied to region 59 to restore the valve to a fully open position. If piston 41 has moved beyond conduit 60 when power is restored, the valve continues to close by the pressure applied thereabove and the force of spring 51. Once the valve is fully closed it can be reopened only by manual adjustment of valves 61 and 58. To reopen the valve, solenoid 70 is energized, valve 61 is closed and valve 58 is opened.

It is desired that the lower edge of piston 41 not move below conduit 57 when the valve closes. This can be accomplished by proper valve construction. Furthermore, conduit 57 can enter region 59 through the bottom plate of chamber 35. It is also important that the upper edge of piston 41 not move above conduit 55. This can be accomplished in one of several ways. Spring 51 can be selected to be fully compressed before piston 41 moves above conduit 55; conduit 55 can enter region 56 through plate 36; or a stop, not shown, can be positioned in the upper portion of chamber 35.

If the fluid pressure supplied by conduit 63 is interrupted for any reason, then the pressure in region 59 is reduced as the fluid leaks out conduit 73 and the valve is closed by the force of spring 51. This provides a second safety feature in the event of pressure failure. Rod 49 is provided to indicate whether the valve is open or closed. This rod can also be used to open the valve manually against spring 51.

From the foregoing description of a preferred embodiment of this invention it should be apparent that there is provided an improved time delay safety shut-off valve which can be employed effectively in a vacuum system to disconnect the vacuum chamber from the vacuum pump in the event of power failure. While the invention has been described in conjunction with the present preferred embodiment it should be apparent that the invention is not limited thereto.

What is claimed is:

1. A shut-off valve comprising, in combination, a valve body including a valve seat, a valve head engageable with said valve seat, a piston chamber mounted adjacent said valve body, a piston positioned for movement in said chamber, said piston being secured to said valve head, first conduit means communicating with said chamber on the first side of said piston whereby said valve is closed when said piston is moved away from the opening of said first conduit means into said chamber, second conduit means communicating with said chamber at a position on the second side of said piston when said valve is in a fully open position, a source of fluid under pressure, and an electrically operated valve connecting said source of fluid to said second conduit means when current is supplied to said electrically operated valve, said electrically operated valve connecting said source of fluid to said first conduit means in the absence of current being supplied to said electrically operated valve.

2. The combination in accordance with claim 1 further comprising means connected to said piston to indicate the position thereof in said chamber.

3. A shut-off valve comprising, in combination, a valve body including a valve seat, a valve head engageable with said valve seat, a piston chamber mounted adjacent said valve body, a piston positioned for movement in said chamber, said piston being secured to said valve head, first conduit means communicating with said chamber on the first side of said piston whereby said valve is closed when said piston is moved away from the opening of said first conduit means into said chamber, second conduit means communicating with said chamber at a position on the second side of said piston when said valve is in a fully open position, a source of fluid under pressure, a first vent in said chamber on said first side of said piston, a second vent in said chamber on said second side of said piston, a source of fluid under pressure, and an electrically operated valve connecting said source of fluid to said second conduit means when current is supplied to said electrically operated valve, said electrically operated valve connecting said source of fluid to said first conduit means in the absence of current being supplied to said electrically operated valve.

4. A shut-off valve comprising, in combination, a valve body including a valve seat, a valve head engageable with said valve seat, a piston chamber mounted adjacent said valve body, a piston positioned for movement in said chamber, said piston being secured to said valve head, a first conduit communicating with said chamber at a first position which is on the first side of said piston irrespective of the location of said piston in said chamber, a second conduit communicating with said chamber at a second position which is on the second side of said piston irrespective of the location of said piston in said chamber, a valve in said second conduit, a third conduit communicating with said chamber at a third position which is on said first side of said piston when said valve is closed and which is on said second side of said piston when said valve is open, a valve in said third conduit, a source of fluid pressure, and an electrically operated valve connecting said source of pressure to said second and third conduits when current is supplied to said electrically operated valve, said electrically operated valve connecting said source of pressure to said first conduit in the absence of current being supplied to said electrically operated valve.

5. A shut-off valve comprising, in combination, a valve body including a valve seat, a valve head engageable with said valve seat, a piston chamber mounted adjacent said valve body, a piston positioned for movement in said chamber, said piston being secured to said valve head, a first conduit communicating with said chamber at a first position which is on the first side of said piston irrespective of the location of said piston in said chamber, a second conduit communicating with said chamber at a second position which is on the second side of said piston irrespective of the location of said piston in said chamber, and a third conduit communicating with said chamber at a third position which is on said first side of said piston when said valve is closed and which is on said second side of said piston when said valve is open.

6. The combination in accordance with claim 5 further comprising a spring urging said valve head into engagement with said valve seat.

7. A shut-off valve comprising, in combination, a valve body including a valve seat, a valve head engageable with said valve seat, a piston chamber mounted adjacent said valve body, a piston positioned for movement in said chamber, a plunger connecting said valve head with said piston, a spring interposed between said valve head and said chamber to urge said valve head into engagement with said valve seat, a flexible bellows enclosing said plunger in said valve body, said bellows being secured to said valve head and said chamber, a vent communicating between the interior of said bellows and the exterior of said valve body, a first conduit communicating with said chamber at a first position which is on the first side of said piston irrespective of the location of said piston in said chamber, a second conduit communicating with said chamber at a second position which is on the second side of said piston irrespective of the location of said piston in said chamber, and a third conduit communicating with said chamber at a third position which is on said first side of said piston when said valve is closed and which is on said second side of said piston when said valve is open.

8. A vacuum system comprising, in combination; a vessel to be evacuated; an electrically operated pump connected to said vessel to evacuate same; a source of electrical energy to operate said pump; and a shut-off valve connected between said vessel and said pump, said shut-off valve comprising a valve body including a valve seat, a valve head engageable with said valve seat, a piston chamber mounted adjacent said valve body, a piston positioned for movement in said chamber, said piston being secured to said valve head, first conduit means communicating with said chamber on the first side of said piston whereby said valve is closed when said piston is moved away from the opening of said first conduit means into said chamber, second conduit means communicating with said chamber at a position on the second side of said piston when said valve is in a fully open position, a source of fluid under pressure, and an electrically operated valve connecting said source of fluid to said second conduit means when current is supplied to said electrically operated valve, said electrically operated valve connecting said source of fluid to said first conduit means in the absence of current being supplied to said electrically operated valve, said electrically operated valve being energized by said source of electrical energy.

9. A mass spectrometer comprising, in combination; a mass spectrometer tube; a source of gas to be analyzed; a line having a small orifice therein communicating between said source of gas and said tube; an electrically operated vacuum pump; an oil diffusion pump connected to the inlet of said vacuum pump; a second line connecting the inlet of said diffusion pump with said tube; a baffle disposed in said second line; a shut-off valve disposed in said second line, said shut-off valve comprising a valve body including a valve seat, a valve head engageable with said valve seat, a piston chamber mounted adjacent said valve body, a piston positioned for movement in said chamber, said piston being secured to said valve head, a first conduit communicating with said chamber at a first position which is on the first side of said piston irrespective of the location of said piston in said chamber, a second conduit communicating with said chamber at a second position which is on the second side of said piston irrespective of the location of said piston in said chamber, a valve in said second conduit, a third conduit communicating with said chamber at a third position which is on said first side of said piston when said valve is closed and which is on said second side of said piston when said valve is open, a valve in said third conduit, a source of fluid pressure, and an electrically operated valve connecting said source of pressure to said second and third conduits when current is supplied to said electrically operated valve, said electrically operated valve connecting said source of pressure to said first conduit in the absence of current being supplied to said electrically operated valve; and a source of electrical energy to operate said vacuum pump and said electrically operated valve.

10. A vacuum system comprising, in combination, a vessel to be evacuated, a vacuum pump connected to said vessel, a source of power connected to said pump, a shut-off valve connected between said vessel and said pump, means responsive to said source of power to retain said valve open when power is supplied to said pump and to close said valve when power is removed from said pump, and means to delay the closing of said valve when power is removed from said pump so that said valve is not closed if power is restored to said pump within a predetermined time following removal of power from said pump.

11. A vacuum system comprising, in combination, a vessel to be evacuated, a diffusion pump, an electrically operated vacuum pump connected downstream of said diffusion pump, a source of electrical energy to energize said vacuum pump, a shut-off valve connected between said vessel and said diffusion pump, means for applying said source of electrical energy to said valve so that said valve is open as long as energy is supplied to said pump but is closed in the absence of energy being supplied to said pump, and means to delay closing of said valve so that said valve is not closed if energy is restored to said pump within a predetermined time following removal of energy from said pump.

12. A mass spectrometer comprising, in combination, a mass spectrometer tube, a source of gas to be analyzed, a conduit having a small orifice therein communicating between said source of gas and said tube, an electrically operated vacuum pump, an oil diffusion pump connected to the inlet of said vacuum pump, conduit means connecting the inlet of said diffusion pump to said tube, a baffle disposed in said conduit means to prevent vaporized oil in said diffusion pump from entering said tube, a shut-off valve connected in said conduit means, a source of electrical energy to operate said valve and said pump, means energized by said source of electrical energy to retain said valve open when power is supplied to said pump and to close said valve when power is removed from said pump, and means to delay closing of said valve so that said valve is not closed if power is restored to said pump within a predetermined time following removal of power from said pump.

References Cited in the file of this patent

UNITED STATES PATENTS

| | | |
|---|---|---|
| 1,020,685 | Cubelic | Mar. 19, 1912 |
| 1,158,029 | Dantsizen | Oct. 26, 1915 |